United States Patent [19]

Suzuki et al.

[11] 4,421,398
[45] Dec. 20, 1983

[54] FOCUSSING PLATE

[75] Inventors: Takashi Suzuki; Kiyoshi Iizuka, both of Yokohama; Keiji Ohtaka, Tokyo; Hidemasa Mizutani, Kawasaki, all of Japan

[73] Assignee: Canon Kabushiki Kaisha, Tokyo, Japan

[21] Appl. No.: 473,266

[22] Filed: Mar. 14, 1983

Related U.S. Application Data

[63] Continuation-in-part of Ser. No. 278,220, Jun. 26, 1981, abandoned.

[30] Foreign Application Priority Data

Jun. 27, 1980 [JP] Japan ................................. 55-88027
Jun. 27, 1980 [JP] Japan ................................. 55-88030

[51] Int. Cl.$^3$ ............................................. G03B 13/02
[52] U.S. Cl. ................................................. 354/200
[58] Field of Search ....................... 354/195, 199, 200

[56] References Cited

U.S. PATENT DOCUMENTS

| | | |
|---|---|---|
| 3,602,085 | 8/1971 | Wagner et al. ...................... 354/200 |
| 3,661,065 | 5/1972 | Yamazaki et al. .................. 354/200 |
| 4,003,637 | 1/1977 | Masuoka ............................. 354/200 |
| 4,309,093 | 1/1982 | Kuwayama et al. ................ 354/199 |

FOREIGN PATENT DOCUMENTS

| | | |
|---|---|---|
| 524782 | of 1956 | Canada ................................ 354/200 |
| 55-70827 | 5/1980 | Japan .................................. 354/200 |
| 706741 | of 1954 | United Kingdom ................ 354/200 |

Primary Examiner—Russell E. Adams
Attorney, Agent, or Firm—Fitzpatrick, Cella, Harper & Scinto

[57] ABSTRACT

A focussing plate for photographic cameras, etc. which is constructed with a multitude of micro-lens shaped curved surfaces arranged on a substrate surface at a space interval among them of from 5 to 30 μm, and other curved surfaces arranged in the boundary spaces among these micro-lens shaped curved surfaces having a curvature just opposite to that of the micro-lens shaped curved surfaces.

16 Claims, 12 Drawing Figures

FOCUSSING PLATE

This application is a continuation-in-part of application Ser. No. 278,220 filed June 26, 1981, now abandoned.

BACKGROUND OF THE INVENTION

1. Field of the Invention

This invention relates to improvement in a focussing plate for use in a single-lens reflex camera and an 8 mm- or 16 mm-cinematographic camera.

2. Description of the Prior Art

Heretofore, an acryl mat having the same surface structure and diffusion characteristic as those of frosted glass has long been used as a standard focussing plate screen for a single-lens reflex camera, etc.. However, since such acryl mat has no smooth undulating surface, the light quantity to be diffused outside a view-finder is considerable, on account of which, when the lens aperture is constricted, the view-finder sight becomes abruptly dark and granularity of the mat surface (fine granular projections like scattered fine sands) becomes which is disadvantageous.

In order to prevent such granularity from being noticeable, it has been contemplated to render the surface of the focussing plate to be in such fine and uniform structure that no granularity thereon is recognizable, or in a regular structure in view of the granularity deriving from irregular surface structure of the focussing plate.

As the focussing plate which has solved the problem of granularity by using the latter-mentioned regular structure, there is known an overall micro-screen. The overall micro-screen is such one that a multitude of trilateral or quadrilateral pyramids, each having 0.1 mm or so at each side on the bottom surface, are disposed on the entire surface of the screen. This overall micro-screen begins to abruptly darken beyond a certain F-number of the len depending on the angle of inclination of the slant surface in the trilateral or quadrilateral pyramids filled in the screen surface, and becomes of no use for range detection. On account of this, it is used as a replacement screen (a screen which is used exchangeably in conformity to a lens used.)

The overall micro-screen for a standard lens has an angle of inclination of 8 degrees or so for each pyramid (an angle of refraction of upto and including 4 degrees). In this micro-screen, when the lens aperture is constricted, the darkening starts from F-4 or so, and the focussing becomes considerably dull at F-8 or around it. In order to avoid such unfavorable condition, an overall micro-screen having an angle of inclination of 4 degrees or so (an angle of refraction of upto and including 2 degrees) is provided for a small diameter lens. Even in such micro-screen, abrupt darkening takes place at a high F-number. In the case of using overall microscreens available in general market, some of them produce Moire pattern between it and a Fresnel lens, along with darkening.

There has also been known a screen wherein a plurality of very small lenses are arranged regularly. However, boundaries among these very fine pyramids or lenses are not so smooth that light scattering takes place within a wide angle and, the view-finder to become dark. This result is not desirable for our object.

SUMMARY OF THE INVENTION

The present invention has been made in view of the afore-mentioned facts, and aims at providing a focussing plate which is capable of producing a bright view-finder image, which does not cause abrupt darkening even when the lens aperture is constricted, and which does not render its granularity noticeable.

With a view to attaining the abovementioned object, the present invention effects the following two basic points of improvement. Firstly, instead of using a plurality of pyramidal bodies, each having inclined surfaces of a certain angle as the individual micro-elements to form the surface structure of the focussing plate, there are regularly arranged smooth, micro-lens shaped curved surfaces, the boundaries among these micro-lens shaped curved surfaces being smoothly joined with curved surfaces having a curvature opposite to that of the abovementioned micro-lens shaped curved surfaces, thereby eliminating the abrupt darkening at the time of narrowing the lens aperture. Secondly, a pitch of the plurality of regularly arranged micro-lens shaped curved surfaces is made as small as 5 to 30 microns to render the granularity unnoticeable in conjunction with their regular arrangement.

The focussing plate according to the present invention may be used as a replacement screen having a specific region of angle of view selected from a wide angle lens to a super-telescopic lens, rather than a standard screen encompassing such wide angle to super-telescopic lenses, whereby its granularity is made perfectly unnoticeable and the resulting focus is clear and sharp. Further, the focussing plate of the present invention in such a construction, as mentioned above, may be a diffraction grating focussing plate by the fineness of the pitch, rather than the overall micro-focussing plate, and has a luminous intensity characteristic to be determined from a cross-sectional shape of each grating (i.e., phase structure) and the pitch. Usually, the diffracted light is classified into three orders "zero-order", "first-order", and "second-order". If the angle of diffraction of the first-order is set at 2 degrees or so, and that of the second-order at 4 degrees or so, the range finding is possible in an appropriate range of the replacement lens or aperture.

DESCRIPTION OF THE PREFERRED EMBODIMENTS

In the following, preferred embodiments of the present invention will be explained in detail by referring to the accompanying drawing.

The structure of the focussing plate according to the present invention having the favorable characteristics as mentioned in the foregoing can be fabricated by a novel method developed by the present inventors (vide: Japanese patent application No. 53-165092). This method of fabricating the focussing plate is to generate first a two-dimensional interference pattern by use of a special interferometer, then this interference pattern is recorded on a photosensitive material having a function of converting light intensity distribution to irregularity (concavo-convex) distribution on the surface of the focussing plate, and thereafter a metal mold is manufactured by electroforming with the abovementioned recorded member having the irregularity distribution recorded thereon as a master for the mold, from which the focussing plate of a plastic material is molded in a mass-production scale.

Figure 1:
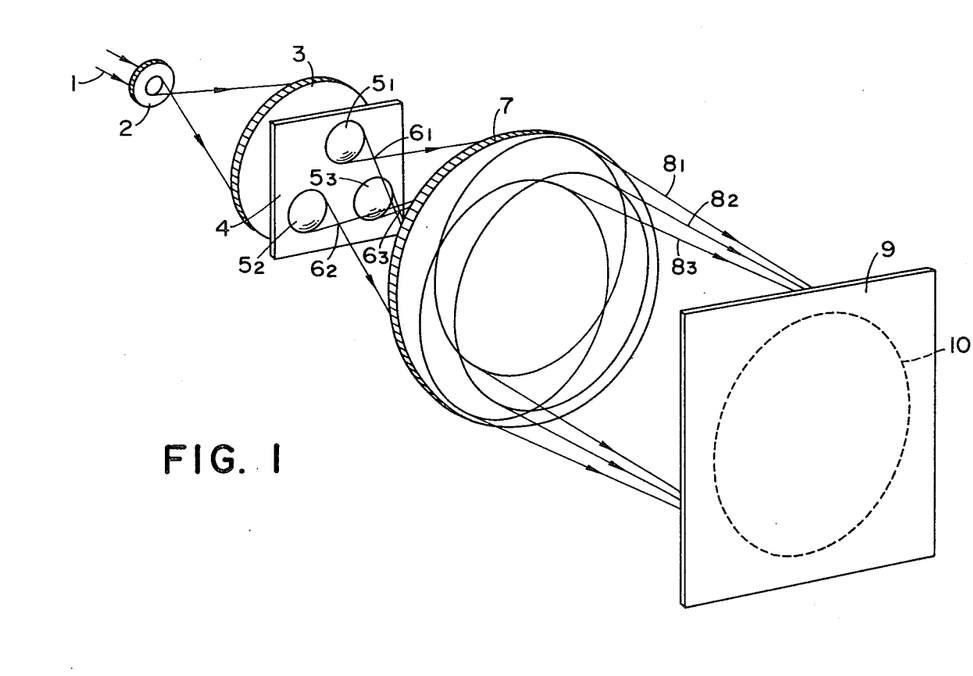
FIG. 1 is a schematic perspective view showing an interferometer to fabricate one embodiment of the focussing plate according to the present invention.

Referring now to FIG. 1, a reference numeral 1 designates a laser beam, numerals 2, 3 refer to a beam expander system, 4 designates a lens holder to hold therein three lenses $5_1$ to $5_3$, and $6_1$ to $6_3$ designate three actual point light sources produced by the three convex lenses. Depending on situation, there may be provided at the position of each point source a filter having a fine opening, which is slightly larger than the size of the point light source, so as to eliminate undesirable noises to be caused by dusts, etc. adhered on the lens surface.

Figure 2:
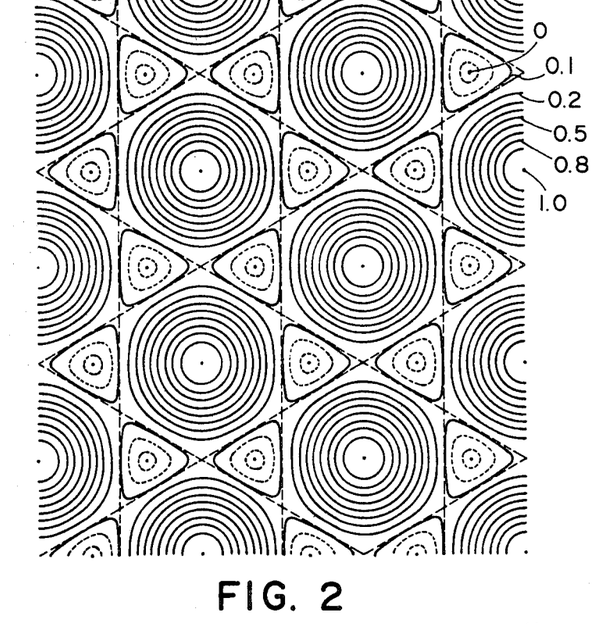
FIG. 2 is a pattern diagram showing intensity distribution of an interference pattern obtained by the interferometer shown in FIG. 1.

Since a plane to be determined by the three points of $6_1$ to $6_3$ is coincident with the focal plane of a lens 7, three collimated beams $8_1$ to $8_3$ are projected from the lens 7 and impinged on a photo-recording material 9. By adjusting the space interval between the lenses 2 and 3, it becomes possible to superpose on the surface of the photo-recording material the illuminating regions of these three collimated light beams as a region 10. At the region 10 where the expanded light beams $8_1$ to $8_3$ from the point sources are superposed, there is developed an interference pattern resulted from these three light beams. When the three point sources $6_1$ to $6_3$ are positioned substantially at the apex of a regular triangle, this interference pattern has a two dimensional cycle structure as represented in FIG. 2. The size of each and every pattern in FIG. 2 can be readily controlled by varying the space intervals among the point sources in FIG. 1, or by varying the space interval between the arranged point sources and the pattern recording member in FIG. 1. It is easy to obtain a pattern of a size of 1 micron or so.

Figure 3:
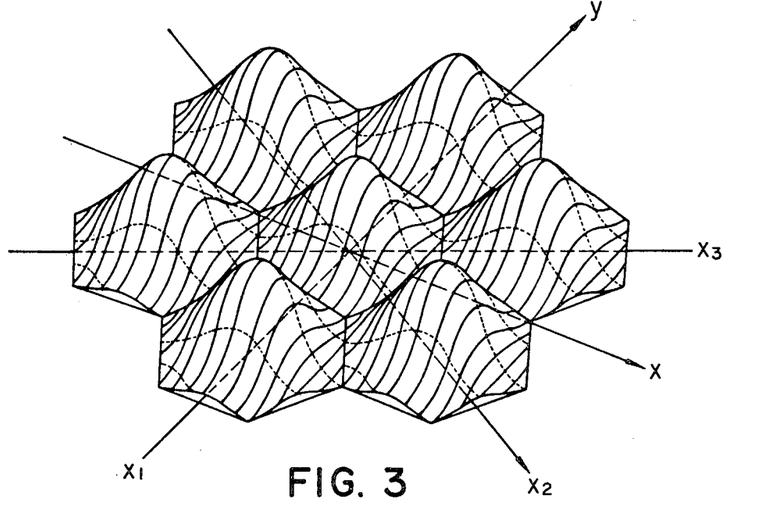
FIG. 3 is a fragmentary perspective view of the first embodiment of the focussing plate according to the present invention as shown in FIG. 1.

In FIG. 2, a center surrounded by substantially concentric circles in solid lines denotes the maximum intensity of the interference pattern, while a center point enclosed by broken lines and symmetrically with respect to the first-mentioned center point surrounded by the solid lines, denotes the minimum intensity of the interference pattern. Contour lines of the pattern intensity of 0.9, 0.8, ... are indicated by solid lines and broken lines, respectively, provided that the intensity of the first-mentioned center point is "1" and the intensity of the second-mentioned center point is "zero". The intensity distribution of such interference pattern is recorded on various types of recording members, which is then converted into a relief pattern where the micro-lens shaped curved surfaces are regularly arranged. In this case, it should be noted that the concavo-convex shapes are governed by the conversion characteristic $\gamma$. FIG. 3 illustrates a fragmentary perspective view of the concavo-convex surfaces of the focussing plate recorded on the sensitive member having the conversion characteristic $\gamma=1$, i.e., a relief pattern represented by the contours in FIG. 2. As is apparent from FIG. 2, the surface of this focussing plate contains therein the micro-lens shaped convex surfaces which are regularly arranged in a densely filled condition. The boundaries among these convex surfaces are smoothly joined by concave surfaces of a curvature opposite to that of the convex surfaces, so that there is no place in it where abrupt light scattering is caused. The shape of this relief pattern is given by a height distribution $T(x, y)$ which can be represented by the following equation.

$$T(x,y)=1/9[3+2\{2\cos x\cdot\cos\sqrt{3}y+\cos 2x\}] \qquad (1)$$

In the following, explanations will be given as to a process, by which the abovementioned height distribution T is obtained by the interferometer shown in FIG. 1.

In FIG. 1, the positions of the abovementioned point light sources $6_1$, $6_2$, $6_3$ are set respectively (0, a), $(\sqrt{3}a/2, -a/2)$, $(\sqrt{3}a/2, -a/2)$ with respect to the coordinate (x', y') within a plane perpendicular to the optical axis and containing the point sources $6_1$, $6_2$, $6_3$. When the direction of the optical axis is z', the propagating direction of the light emitted from each point source and passing through the lens 7 (cosine $S_1$, $S_2$, $S_3$) is represented as follows:

$$S_1=(0, -a/u, f/u), S_2=(3a/2u, a/2u, f/u),$$

$$S_3=(-3a/2u, a/2u, f/u) \qquad (2)$$

(provided that $u=\sqrt{a^2+f^2}$, where f is a focal length of the lens 7).

Accordingly, when the coordinate on the recording surface is taken afresh as (x, y, z), the interference pattern formed by superposition of the three light waves can be represented by the following intensity distribution I.

$$I=|\exp(ikS_1\cdot H)+\exp(ikS_2\cdot H)+\exp(ikS_3\cdot H)|^2 \qquad (3)$$

The interference pattern on the photo-recording member 9 is given by I, when Z=0. Consequently, as mentioned above, the height distribution T of the relief pattern on the focussing plate according to this embodiment of the invention corresponds to the abovementioned intensity distribution I. Now assume that the peak value of the intensity distribution of the interference pattern is standardized as "1", it can be denoted as follows:

$$T=1/9[3+4\cos(k\cdot\sqrt{3}a/2u)x\times\cos(k\sqrt{3}a/2u)y+2\cos(k\sqrt{3}a/u)x] \qquad (4)$$

In this case, when the coordinate is converted from $(k\sqrt{3}a/2u)x$ to x and $(k\sqrt{3}a/2u)y$ to y, the height distribution T(x, y) is ultimately obtained as $T = (x,y) = 1/9[3 + 2\{2 \cos x \cdot \cos \sqrt{2}y + \cos 2x\}]$, which is same as the Equation (1). Thus, the focusing plate of the present embodiment has its height distribution given by the Equation (1), wherein the micro-lens shaped curved surfaces are smoothly joined. Further, in FIG. 3, the cross-sectional shape which is in parallel with the axis $x_1$ and perpendicular to the bottom surface is represented by a cosine function having same pitch and different amplitude.

Figure 4:
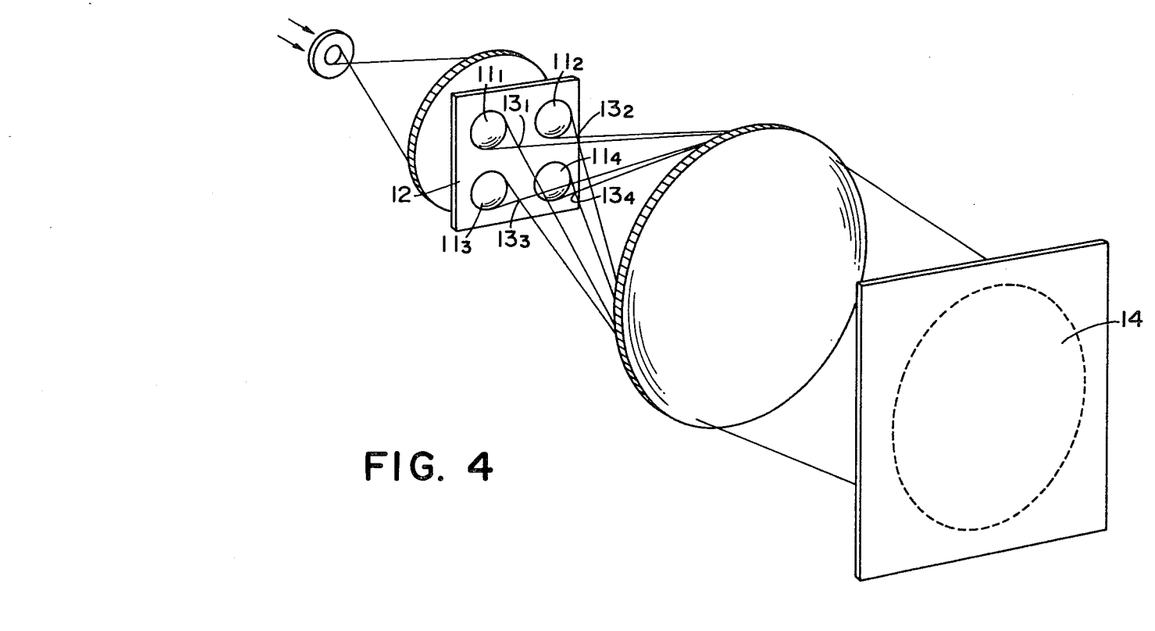
FIG. 4 is a schematic perspective view showing an interferometer to fabricate another embodiment of the focussing plate according to the present invention.
Figure 5:
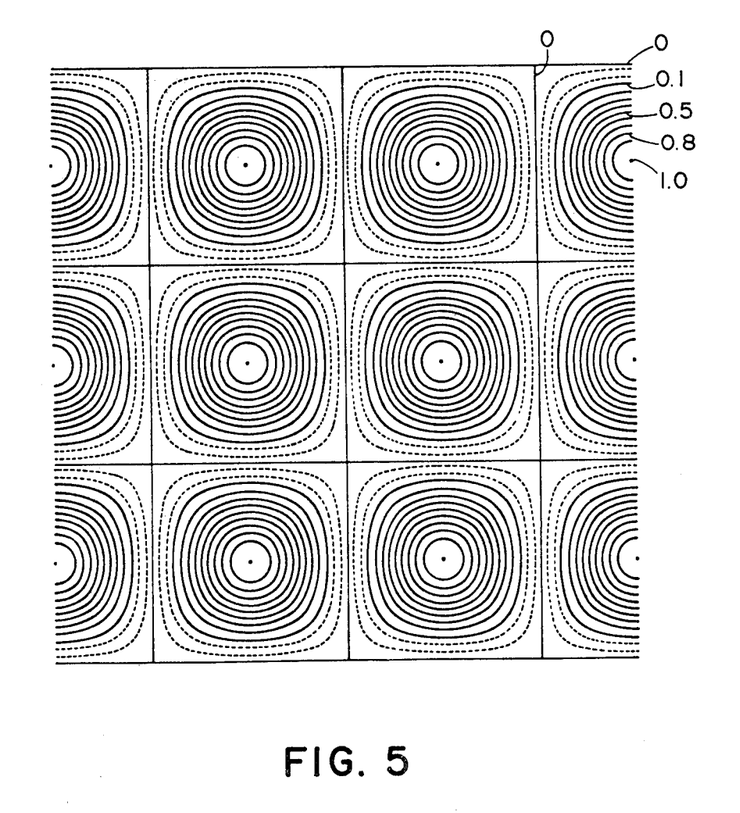
FIG. 5 is a pattern diagram showing intensity distribution of an interference pattern obtained by the interferometer shown in FIG. 4.
Figure 6:
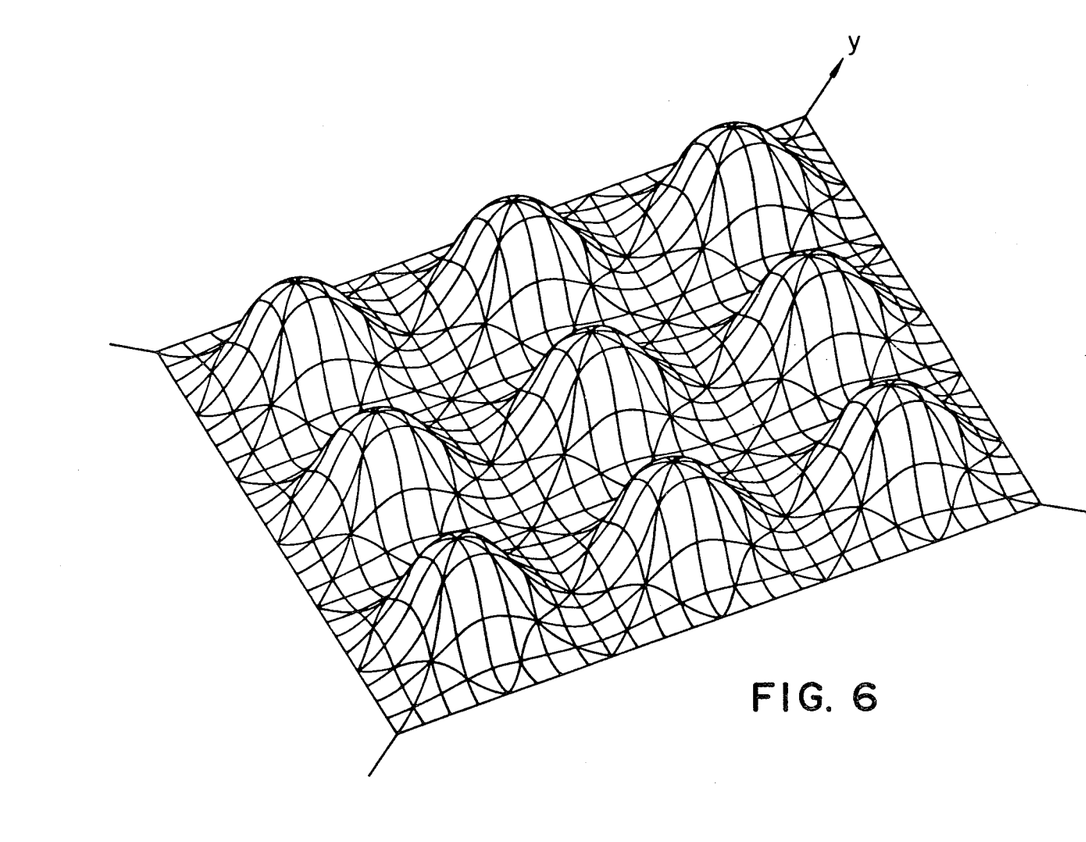
FIG. 6 is a fragmentary perspective view of the second embodiment of the focussing plate shown in FIG. 4.

FIG. 4 to FIG. 6 illustrate the second embodiment of the present invention which is different from the first embodiment in its symmetry.

FIG. 4 shows the interferometer, wherein the point sources for fabricating the focussing plate of the second embodiment of the present invention are so arranged as to constitute the corners of a square. The difference of this interferometer from that shown in FIG. 1 resides only in replacement of the lenses $5_1$ to $5_3$, the lens holder 4, and three point source arrangement $6_1$ to $6_3$ constituting the apex of a regular triangle in FIG. 1 for the lenses $11_1$ to $11_4$, the lens holder 12, and the four point light sources arrangement $13_1$ to $13_4$ constituting the corners of the square.

FIG. 5 illustrates a contour representation, same as in FIG. 2, of the intensity distribution of the two-dimensional interference pattern to be obtained at a region 14 in the interferometer shown in FIG. 4, where four collimated light beams are superposed. In the drawing, the center point surrounded by the concentric contour lines denotes the intensity "1", which decreases to 0.9, 0.8, . . . as the contour shifts outward, and the intensity on the sectioning lines constituting the boundary between the adjacent convexes is "0".

FIG. 6 shows the fragmentary perspective view of the focussing plate according to the second embodiment of this invention to be obtained in correspondence to the intensity distribution in FIG. 2, same as that in the first embodiment. The height distribution T(x, y) of this relief pattern is given by the following equation.

$$T(x, y) = \tfrac{1}{4}(\cos x + \cos y)^2 \quad (5)$$

Derivation of the above equation is given by the following equation, provided that, as is the case with the first embodiment, the positional coordinates of the point sources $13_1$ to $13_4$ are represented by (a, 0), (0, a), (−a, 0), and (0, a), respectively, and the cosine of the ight wave propagating direction is set at $S_1 = (-a/u, 0, f/u)$, $S_2 = (0, a/u, f/u)$, $S_3 = (a/u, 0, f/u)$, and $S_4 = (0, -a/u, f/u)$:

$$I = \tfrac{1}{4} \sum_{j=1}^{4} \exp(ikS_j \cdot H) \quad (6)$$

Same as above, when the maximum intensity is defined as "1", and the coordinate conversion is effected as $(ka/u)x \to x$, $(ka/u)y \to y$, the above equation (5) is changed to $T(x, y) = \tfrac{1}{4} (\cos x + \cos y)^2$, which represents the same height distribution as the equation (5).

In the case of FIG. 6, the cross-sectional shape which is parallel to the axes x and y, and perpendicular to the bottom surface (x–y plane) can be represented by the cosine function with the same and different amplitude.

In the explanations so far made, the conversion characteristic ($\gamma$) of each photo-recording material has been set at $\gamma = 1$. This conversion characteristic, however, may be different from $\gamma = 1$ depending on the recording material. That is, in the case of a photoresist, the value $\gamma$ is usually very high. For example, "Kodak Ortho-Resist" has an exposure range, in which a residual film thickness is proportionate to the exposure quantity, and, with a higher exposure quantity, the residual film thickness is proportionate to "log E" (E denotes exposure quantity) [vide: J. P. Kirk & G. L. Fillmore; Applied Optics, 11 (10), 2347 (1972)].

In the field of the basic studies and researches of hologram, progress is under way in developing a resist processing method, wherein a sine-functional interference pattern is converted to a sine-functional irregularity distribution [vide: R. A. Bartolini: Applied Optics, 11 (5) 1275 (1972)].

Still another, as the method for converting the light intensity distribution to irregularity distribution, there have been known various silver-salt bleaching methods [vide: J. H. Altman; Applied Optics, 5 (10) 1689 (1966)].

The abovementioned methods convert the intensity distribution (exposure quantity distribution) to the irregularity (concavo-convex) distribution in accordance with $T \propto D$ (density) $\propto \log_{10} E$ (exposure quantity). [R. L. Lamberts: Applied Optics, 11 (1) 23 (1972)]

Further, a non-hardenable type dichromated gelatin possesses a linear characteristic in its varying quantity between exposure quantity and irregularity [D. Meyerhofer; Applied Optics, 10 (2), 416 (1971)]. When the exposure versus irregularity varying characteristic is linear, there can be obtained the focussing plate with the contour lines of the irregularity quantity being as represented by either FIG. 2 or FIG. 5 (the perspective views in these cases being given in FIGS. 3 and 6).

Figure 7:
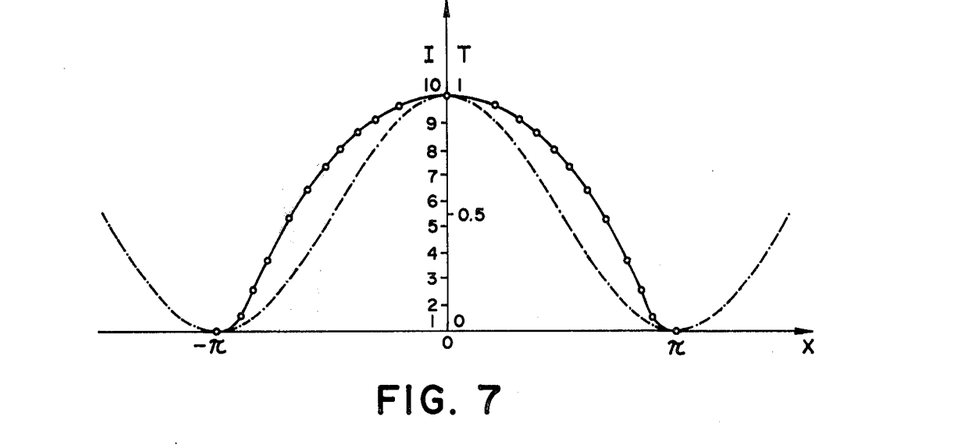
FIG. 7 is a graphical representation showing intensity distribution of the interference patterns in the focussing plate according to the present invention.

When a sensitive material having a characteristic, in which the intensity distribution is converted to the irregularity distribution in accordance with $T \propto \log_{10} I$ (where I denotes the exposure quantity distribution in the intensity distribution), the cosine intensity distribution is converted to the irregular configuration as shown in FIG. 7. That is, when such height distribution is represented by $T'(x,y)$, it can be represented by the following equation with respect to T in the equations (1) and (5)

$$T'(x,y) = A \cdot \log_{10}(\alpha T + \beta) + B \quad (7)$$

(where: A, B, $\alpha$, $\beta$ are constants).

In FIG. 7, the abscissa represents a space coordinate, and the ordinate denotes, at its left side, the intensity, and, at its right side, the value T.

Assume now that a total exposure is represented by "1", and the exposure of the interference pattern is denoted by "E(x) = 4.5 cos x + 4.5". The total exposure quantity can be represented as follows (in place of the total exposure, a beam ratio may be shifted to a certain extent):

$$I(x) = E(x) + 1 = (4.5 \cos x + 4.5) + 1$$

The dot-and-dash line in FIG. 7 represents the above state.

If the conversion of the intensity distribution to the irregularity distribution by the bleaching process of the thus exposed silver-salt dry plate follows the condition of $T \propto D \propto \log_{10} I$, the surfacial shape of the resulting irregularity (concavo-convex) will be as shown by a solid line in FIG. 7. That is to say, it will be seen that the exposure quantity distribution represented by the cosine function changes to the irregular (concavo-convex)

shape which is approximate to more rounded spherical lens than those as shown in FIGS. 3 and 6, and that the boundary surface between the adjacent lenses does not change discontinuously in its inclination, but changes smoothly and continuously. (Note: Most part of the graph in FIG. 7 is approximated to a part of a certain ellipse, although, when the axis of ordinate is shortened, the ellipse is turned to a circle.) In this case, an area ratio between the micro-lens shaped curved surfaces and the curved surfaces occupying the boundary spaces among the lens-shaped curved surfaces is different from 1:1, when the pattern projection is effected onto a plane parallel to the diffusing plate.

Accordingly, the interference pattern in FIGS. 2 and 5 is converted to an irregular (concavo-convex) surface shape, wherein the micro-lenses are arranged regularly and densely. It is to be noted incidentally that, in the interferometer of FIGS. 1 and 4, the arrangement of the three or four lenses may be changed to a diamond or rectangular form to position the individual lenses on the apex of the diamond or rectangle, thereby varying the intensity distribution of the interference pattern to be formed, from which the irregular (concavo-convex) surface following such intensity distribution is obtainable.

The thus obtained sensitive member is subjected to thick electric plating on its surface. Thereafter, a metal mold is obtained, which is then combined with a Fresnel mold to shape out various kinds of acryl focusing plates. It is also possible to fabricate the focusing plate having different pitches in two orthogonally intersecting directions by uni-directionally extending the recording member, on which the relief pattern of the above-described embodiments has been recorded. Such a focusing plate might in some cases be used for a view-finder which necessitates rotation asymmetric light diffusion, and other like apparatus.

Using the interference pattern of FIG. 2, there were produced focusing plates, each having a pitch (peak-to-peak) of approximately 15μ, 20μ and 25μ. Height of the irregularity (concavo-convex) was varied in a range of from 0.7μ to 1.5μ, or so.

When the thus obtained experimental focusing plates of the abovementioned pitches were incorporated into photographic cameras for testing, it has been verified that the focusing plates expectedly produced a very clear image free from granularity, which could not previously be made. It has also been found out as result of various experiments that the pitch of a range of from 5 to 30 μm and the height of the irregularity of from 0.3 to 3μ were functionally desirable.

As stated in the foregoing, the focusing plate according to the present invention has very smooth curved surfaces in its structure, regularity in their arrangement, and fine pitches among them, which makes it possible to observe a bright and clear view-finder image. Additionally, the focusing plate is perfectly free from the granularity on its surface.

In the following, explanations will be given as to the luminous intensity characteristic of the focusing plate according to the present invention.

Figure 8:
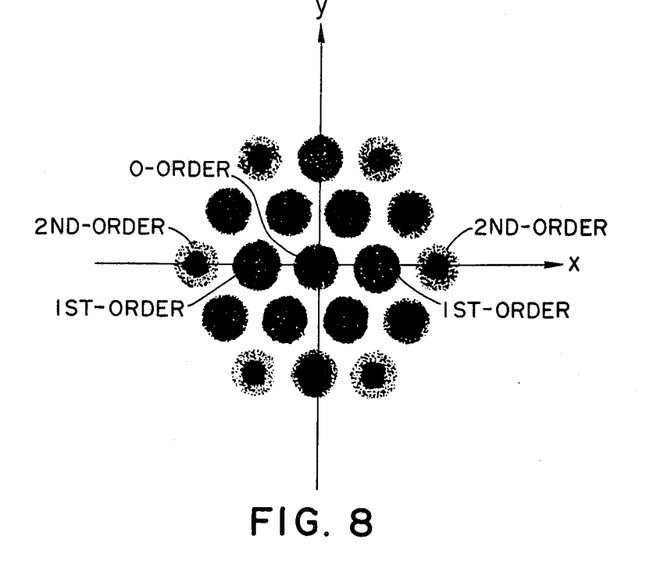
FIG. 8 is a coordinate representation showing a diffracted light by a diffusing plate according to the present invention.

FIG. 8 shows one example of the luminous intensity when the irregular (concavo-convex) pattern is illuminated by a substantially collimated white light beam. In the drawing, values for the luminous intensity appear friskly for the reason that is ascribable to the regular arrangement of the micro-lens shaped curved surfaces, the diffracting and scattering direction of which is limited by an angle θ as shown below, when the recurring cycle of the micro-lens shaped curved surfaces is P, a wavelength is λ, and the order of diffraction is n (n is an integer):

$$\theta = \sin^{-1}(n\lambda/P)$$

Figure 9:
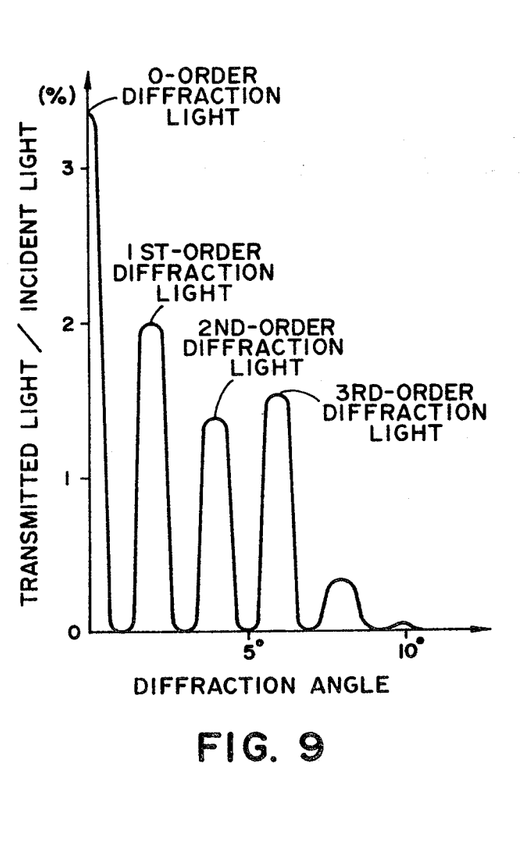
FIGS. 9, 10, 11 and 12 are graphical representations showing the diffracted light distribution by the diffusing plates in each of the abovementioned embodiments.
Figure 10:
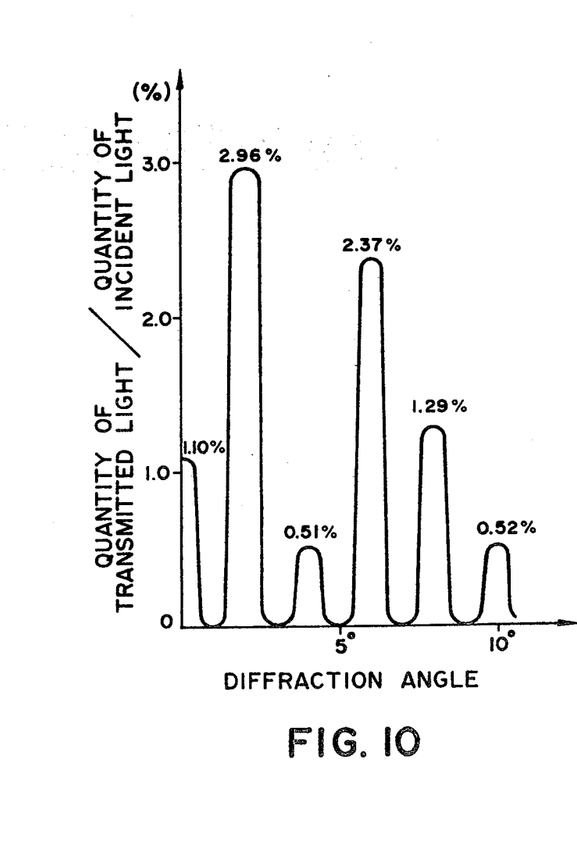
Figure 11:
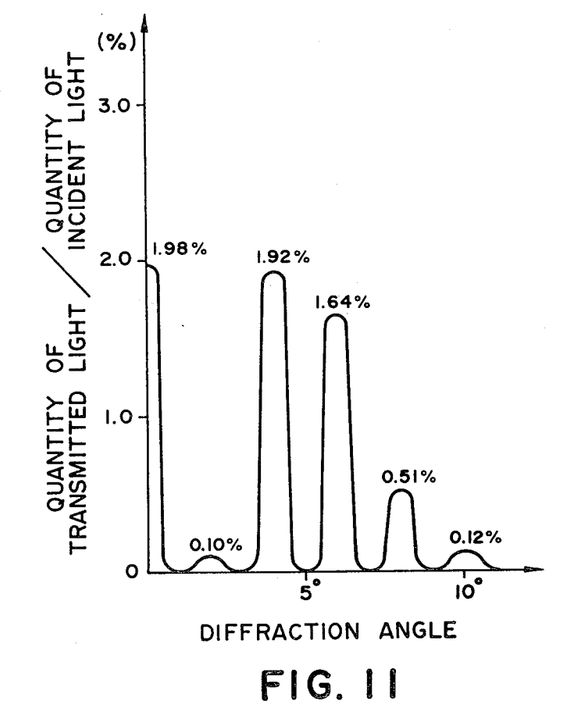

FIGS. 9, 10 and 11 illustrate an example of measurement of the luminous intensity with respect to its direction x as shown in FIG. 8, when three specimens of the focusing plates with the abovementioned micro-lens shaped curved surfaces being arranged in two-dimensional cycle are illuminated with light beam obtained from insertion of an interference filter (having a central wavelength λ≈550 nm, and a wavelength expanding width of 10 mm) into a substantially collimated white light beam emitted from a halogen lamp. Incidentally, these three specimens of the focusing plates are fabricated by differently exposure quantity.

Figure 12:
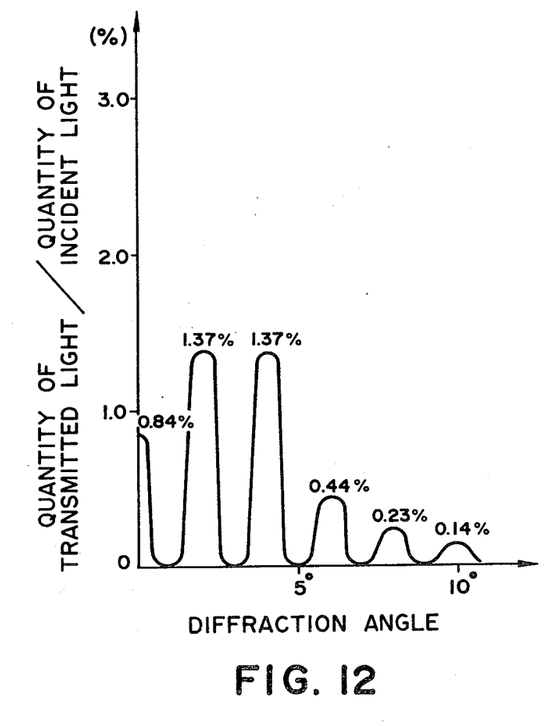

FIG. 12 shows an example of measurement of a diffusing plate of the two-dimensional cycle structure fabricated by the fabrication method of FIG. 1 by disposing four lenses to provide four point light sources.

The abovementioned examples of measurement are all for the dispersion plates which meet the purpose of the present invention. The following Table 1 shows a ratio of each diffracted and transmitted light to the incident light, and a ratio of each diffracted and transmitted light to the zero order transmitted light, with respect to these specimens. (It should be noted that the ratio of each diffracted light shows only one value among the two-dimensional arrangement of the diffracted light as in FIG. 8.)

TABLE 1

| (a) Diffracted and Transmitted Light/Incident Light (%) | | | | | | | | |
|---|---|---|---|---|---|---|---|---|
| | Ex. 1 | Ex. 2 | Ex. 3 | Ex. 4 | Ex. 5 | Ex. 6 | Ex. 7 | Ex. 8 |
| zero-order light | 0.84 | 1.98 | 1.10 | 3.37 | 3.10 | 3.94 | 5.31 | 7.56 |
| first-order light | 1.37 | 0.10 | 2.96 | 4.03 | 0.15 | 1.99 | 0.845 | 0.24 |
| second-order light | 1.37 | 1.92 | 0.51 | 0.29 | 2.69 | 1.39 | 3.41 | 2.86 |
| third-order light | 0.44 | 1.64 | 2.37 | 1.79 | 1.72 | 1.53 | 1.73 | 2.15 |

| (b) Diffracted and Transmitted Light/Zero-Order Diffracted and Transmitted Light | | | | | | | | |
|---|---|---|---|---|---|---|---|---|
| | Ex. 1 | Ex. 2 | Ex. 3 | Ex. 4 | Ex. 5 | Ex. 6 | Ex. 7 | Ex. 8 |
| first-order/zero-order | 1.63 | 0.05 | 2.69 | 1.20 | 0.05 | 0.51 | 0.16 | 0.03 |
| second-order/zero-order | 1.63 | 0.97 | 0.46 | 0.09 | 0.87 | 0.35 | 0.64 | 0.38 |
| third-order/zero-order | 0.52 | 0.83 | 2.15 | 0.53 | 0.55 | 0.39 | 0.33 | 0.28 |

When such a diffusing plate is used as the focusing plate for cameras, there could be obtained a special blurred image due to the diffraction phenomenon derived from the regular arrangement of the lenses, hence focusing is easy. Further, since the focusing plate is bright in its view, and contains the regular arrangement of the lens-shaped curved surfaces, the resultant viewfinder is completely free from granularity (black, fine granular projections) as usually seen in the conventional diffusing plate screen, even when a small-diameter lens (a lens having a large F-number) is used, hence it is very sharp and clear in the image outline.

The characteristic as mentioned above, as is apparent from Table 1 above, has a ratio of the zero-order transmitted and diffracted light to the incident light in a range of from 0.5% and 10%, and is obtainable by at least two of the first to third order transmitted and diffracted lights having a strong diffracted light ratio. That is to say, the first to third order transmitted and diffracted lights can be obtained by simultaneously satisfying at least two of the following three conditions: (i) the ratio of the first-order diffracted light to the incident light is above 1.0%, and below 5%, (ii) the ratio of the second-order diffracted light to the incident light is 1.0% and above, and 4% and below; (iii) the ratio of the third-order diffracted light is 1.0% and above, and 3% and below.

It is desirable that, in each case, the ratio be 15% and below for the zero-order, it be from 0.1 to 10% for the first-order, it be from 0.5 to 5% for the second-order, and it be from 0.1 to 5% for the third-order. More preferably, the ratio between each diffracted light and the zero-order diffracted light satisfy at least two of the following three conditions simultaneously: (iv) the ratio of the first-order diffraction light to the zero-order diffracted light be from 0.5 to 3.0 times; (v) the ratio of the second-order diffracted light be from 0.3 to 2.0 times; and (vi) the ratio of the third-order diffracted light beam from 0.2 to 1.0 times.

Deviating from the above conditions, e.g., if the zero-order transmitted light occupies the most part, a bright spot appears at the center part of the view-finder screen constructed with the focusing plate and its surrounding area is slightly tinted, when the lens aperture is constricted, or a lens of a long focal length is employed. This phenomenon stands for looking at a shadow of a lens pupil, which can be made unnoticeable by reducing the zero-order transmitted light. Further, when two adjacent order numbers of the diffracted lights have small ratios, there occurs such a disadvantage that abrupt darkening would take place upon constriction of the aperture.

As stated in the foregoing, the focusing plate according to the present invention possesses the two-dimensional cycle structure, and this structure has excellent effects such that, by satisfying the conditions relative to the diffracted light derived from the cyclic structure as mentioned in the foregoing, it can solve the problems to take place when the diffusing plate of the present invention is used as the view-finder screen of photographic cameras, thereby realizing highly ideal screen which is bright in view, clear in the image, and highly precise in its range finding.

What we claim is:

1. A focussing plate for use in a camera, comprising:
   a. a plurality of micro-lens shaped curved surfaces arranged on a substrate with each surface having a pitch in the range from 5 to 30 μm; and
   b. a plurality of curved surfaces positioned on the substrate in boundary spaces separating said micro-lens shaped curved surfaces, and having a curvature opposite to that of said micro-lens shaped curved surfaces.

2. The focussing plate as set forth in claim 1, wherein a height distribution T(x,y) of the surface of said focussing plate where said micro-lens shaped curved surfaces are arranged is given by the following equation:

$$T(x, y) = 1/9[3 + 2\{2 \cos x \cdot \cos \sqrt{3}y + \cos 2x\}]$$

(where: x and y denote mutually orthogonally intersecting coordinates within a plane parallel to the focussing plate).

3. The focussing plate as set forth in claim 1, wherein a height distribution T(x, y) of the surface of said focussing plate where said micro-lens shaped curved surfaces are arranged is given by the following equation:

$$T(x, y) = \tfrac{1}{4}(\cos x + \cos y)^2$$

(wherein: x and y denote mutually orthogonally intersecting coordinates within a plane parallel with the focussing plate).

4. The focussing plate as set forth in claim 1, wherein a height distribution T'(x, y) of the surface of said focussing plate where said micro-lens shaped curved surfaces are arranged is given by the following equation:

$$T'(x, y) = A \cdot \log_{10}\{\alpha T(x, y) + \beta\} + B$$

(wherein: T(x, y) is $T(x, y) = 1/9[3 + 2\{2 \cos x \cdot \cos \sqrt{3}y + \cos 2x\}]$ or $T(x, y) = \tfrac{1}{4}(\cos x + \cos y)$; x and y denote mutually orthogonally intersecting coordinates within a plane parallel to the focussing plate; and A, B, α, and β represent constants).

5. The focussing plate as set forth in claim 1, wherein said micro-lens shaped curved surfaces have differing pitches in the two mutually orthogonally intersecting directions.

6. The focussing plate as set forth in claim 1, wherein said micro-lens shaped curved surfaces and those curved surfaces having a curvature opposite to that of said micro-lens shaped curved surfaces are in such a shape that an area ratio between them deviates from 1:1.

7. A focussing plate, comprising:
   a. a plurality of micro-lens shaped curved surfaces arranged on substrate; and
   b. a plurality of curved surface positioned on the substrate in boundary spaces separating said micro-lens shaped curved surface, and having a curvature opposite to that of said micro-lens shaped curved surfaces, wherein when, light having a wavelength of 550 nm is impinged, the zero-order transmitted light is in a range of from 0.5% and 10% in its light quantity ration with respect to said incident light, and further satisfies simultaneously at least two of the following three conditions:
   (i) the first-order transmitted and diffracted light is 1.0% and above, and 5% and below;
   (ii) the second-order transmitted and diffracted light is 1.0% and above, and 4% and below; and
   (iii) the third-order transmitted and diffracted light is 1.0% and above, and 3% and below.

8. The focussing plate as set forth in claim 7, wherein a ratio between said zero-order transmitted light and the transmitted and diffracted lights of other orders satisfies simultaneously at least two of the following three conditions:
   (iv) the first-order transmitted and diffracted light is 0.5 times and above, and 3.0 times and below;
   (v) the second-order transmitted and diffracted light is 0.3 times and above, and 2.0 times and below; and
   (vi) the third-order transmitted and diffracted light is 0.2 times and above, and 1.0 times and below.

9. The focussing plate as set forth in claim 8, wherein said plate is an image projecting screen.

10. The focussing plate as set forth in claim 7, wherein said plate constitutes a focussing plate of a photographic camera.

11. The focussing plate as set forth in claim 7, which is obtained by an optical fabrication method comprising steps of: superposing three or more mutually coherent light beams to form a two-dimensional cyclic interference patterns; and leading the thus obtained interference pattern onto a recording material.

12. The focussing plate as set forth in claim 8, which constitutes the focussing plate of a photographic camera.

13. The focussing plate as set forth in claim 8, which is obtained by an optical fabrication method comprising steps of: superposing three or more mutually coherent light beams to form a two-dimensional cyclic interference patterns; and leading the thus obtained interference pattern onto a recording material.

14. The focussing plate as set forth in claim 9, which is obtained by an optical fabrication method comprising steps of: superposing three or more mutually coherent light beams to form a two-dimensional cyclic interference patterns; and leading the thus obtained interference pattern onto a recording material.

15. The focussing plate as set forth in claim 10, which is obtained by an optical fabrication method comprising steps of: superposing three or more mutually coherent light beams to form a two-dimensional cyclic interference patterns; and leading the thus obtained interference pattern onto a recording material.

16. The focussing plate as set forth in claim 12, which is obtained by an optical fabrication method comprising steps of: superposing three or more mutually coherent light beams to form a two-dimensional cyclic interference patterns; and leading the thus obtained interference pattern onto a recording material.

* * * * *

UNITED STATES PATENT AND TRADEMARK OFFICE
CERTIFICATE OF CORRECTION

PATENT NO. : 4,421,398

DATED : December 20, 1983

INVENTOR(S) : TAKASHI SUZUKI, ET AL.

It is certified that error appears in the above-identified patent and that said Letters Patent is hereby corrected as shown below:

Column 3, line 64, after "symmetrically" insert --positioned--.

Column 4, line 33, "$\sqrt{3a/2}$" (first occurrence) should be -- $-\sqrt{3}$ a/2--; same line, "$\sqrt{3a/2}$" (second occurrence) should be --$\sqrt{3}$ a/2--;

line 64, (formula (4)), "√3a" should be --$\sqrt{3}$a--;

line 65, (line 2, formula (4)), "√3a" should be --$\sqrt{3}$a--;

line 68, "$\sqrt{3a}$" (both occurrences) should be --$\sqrt{3}$ a--.

Column 5, line 2, "√2y" should be --$\sqrt{3}$ y--;

line 48, "a" should be -- -a --;

line 64, after "same" insert --pitch--.

UNITED STATES PATENT AND TRADEMARK OFFICE
CERTIFICATE OF CORRECTION

PATENT NO. : 4,421,398  Page 2 of 2
DATED : December 20, 1983
INVENTOR(S) : TAKASHI SUZUKI, ET AL.

It is certified that error appears in the above-identified patent and that said Letters Patent is hereby corrected as shown below:

Column 6, line 44 (formula (7)), "T(x,y)" should be --T'(x,y)--.

Column 8, line 19, "differently" should be --different--.

Column 10, line 19, "T(x,y)" should be --T'(x,y)--;
    line 23, "(cos x + cos y)" should be --(cos x + cos y)$^2$--.

Column 11, line 8, "patterns" should be --pattern--;
    line 18, "patterns" should be --pattern--.

Column 12, line 5, "patterns" should be --pattern--;
    line 11, "patterns" should be --pattern--;
    line 17, "patterns" should be --pattern--.

Signed and Sealed this

Eighth Day of May 1984

[SEAL]

Attest:

GERALD J. MOSSINGHOFF

*Attesting Officer*  *Commissioner of Patents and Trademarks*